United States Patent [19]

Duvdevani et al.

[11] 4,268,552
[45] May 19, 1981

[54] AUTOMOTIVE FASCIA

[75] Inventors: Ilan Duvdevani, Leonia; Lawrence Spenadel, Westfield, both of N.J.

[73] Assignee: Exxon Research & Engineering Co., Florham Park, N.J.

[21] Appl. No.: 30,078

[22] Filed: Apr. 16, 1979

[51] Int. Cl.³ .............................................. B60R 13/00
[52] U.S. Cl. ..................................... 428/31; 525/333; 260/30.8 R; 260/31.2 MR
[58] Field of Search .................. 428/31; 525/333, 232; 260/30.8 R, 31.2 MR

[56] References Cited

U.S. PATENT DOCUMENTS

| | | | |
|---|---|---|---|
| 4,119,616 | 10/1978 | O'Farrell et al. | 525/333 |
| 4,162,241 | 7/1979 | Canter et al. | 525/232 |
| 4,173,695 | 11/1979 | Brenner et al. | 525/333 |
| 4,184,988 | 1/1980 | Makowski et al. | 525/333 |

Primary Examiner—Marion McCamish
Assistant Examiner—E. Rollins Buffalow
Attorney, Agent, or Firm—Richard E. Nanfeldt

[57] ABSTRACT

This invention relates to improved front and rear fascia of a motor vehicle having improved flexibility, wherein the improved elastomeric composition used in forming the fascia includes a neutralized sulfonated elastomeric polymer, a polyolefinic thermoplastic resin and a preferential plasticizer. The formed fascia has an elastomeric-rich inner core which is composed of a blend of the neutralized sulfonated elastomeric polymer being plasticized with a preferential plasticizer and a polyolefinic thermoplastic resin, and a thermoplastic-rich outer shell which is composed of a thermoplastic blend of a major portion of the polyolefinic thermoplastic resin and a minor portion of the neutralized sulfonated elastomeric polymer being plasticized with a preferential plasticizer.

25 Claims, 3 Drawing Figures

AUTOMOTIVE FASCIA

BACKGROUND OF THE INVENTION

1. Field of the Invention

This invention relates to improved front and rear fascia of a motor vehicle having improved flexibility, wherein the improved elastomeric blend composition used in forming the fascia includes a neutralized sulfonated elastomeric polymer, a polyolefinic thermoplastic resin and a preferential plasticizer.

2. Description of the Prior Art

This invention relates to improved front and rear automotive fascia having an elastomeric-rich inner core and a thermoplastic-rich outer shell and the elastomeric compositions used in forming the automotive fascia include a neutralized sulfonated elastomeric polymer, a preferential plasticizer, and a polyolefinic thermoplastic resin, wherein the compositions can be readily extended with a critically selected class of fillers and oils.

Elastomeric polymers have been used for decorative and functional automotive parts such as trim or in energy-absorbing systems such as a bumper. Bumpers can be readily made by compression holding techniques; however, the formation of the complete front or rear fascia of an automobile is most economically done by an injection molding process. The injection molding of highly extended conventional elastomers, in general, requires extremely high pressure, thereby making it impossible to readily injection mold the complete front or rear automotive fascia. U.S. Pat. No. 3,915,928 is directed towards the formation of a conventional ethylene/propylene copolymer which could be injection molded to form a complete fascia. The compositions of U.S. Pat. No. 3,915,928 are glass filled EPDM terpolymers; however, these compositions have certain inherent disadvantages such as requiring heated molds for crosslinking resulting in long cycle times and in nonreprocessable products, thereby resulting in a high degree of scrap. When injection molded, they tend to form surface "trail" lines due to orientation of the glass fibers. Additionally, the use of glass fibers results in certain ecology problems resulting in increased cost of manufacture due to the necessary ecological control. The instant elastomeric blend compositions while providing improved physical properties such as flexibility, surface hardness, elongation and tensile strength at break also provide a material which is simpler to injection mold, readily reprocessable and one which avoids the ecology problems which are associated with glass filled elastomers.

SUMMARY OF THE INVENTION

This invention relates to improved front and rear fascia of a motor vehicle, wherein the improved elastomeric blend compositions used in forming the fascia include a neutralized sulfonated elastomeric terpolymer, a polyolefinic thermoplastic resin and a preferential plasticizer, wherein the compositions can be extended with critically selected fillers and oils and readily colored with a plurality of pigments. The elastomeric blend compositions of the instant invention are readily reprocessable and exhibit improved physical properties such as flexibility, surface hardness, tensile at break and elongation, as compared to extended conventional thermoelastics which require a more complex molding process and are not reprocessable.

The automotive fascia formed by an injection molding process has an elastomeric-rich inner core which comprises an elastomeric blend of a neutralized sulfonated elastomeric polymer being plasticized by a preferential plasticizer and a polyolefinic thermoplastic resin, and a polyolefinic thermoplastic-rich outer shell (i.e., an outer skin) which comprises a thermoplastic blend of a major portion of the polyolefinic thermoplastic resin and a minor portion of the neutralized sulfonated elastomeric polymer being plasticized with the preferential plasticizer.

GENERAL DESCRIPTION

Figure 1:
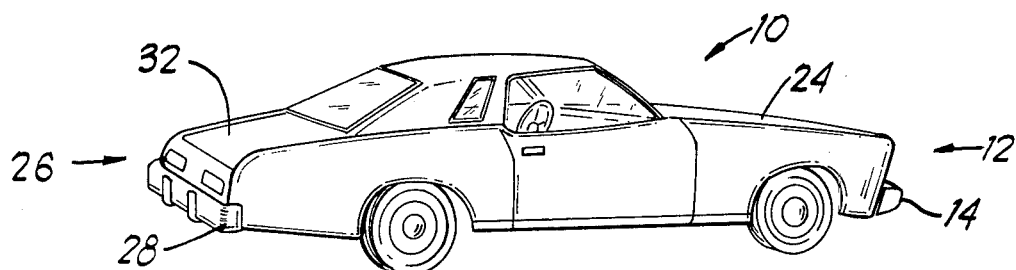
FIG. 1 illustrates a side view of an automobile.
Figure 2:
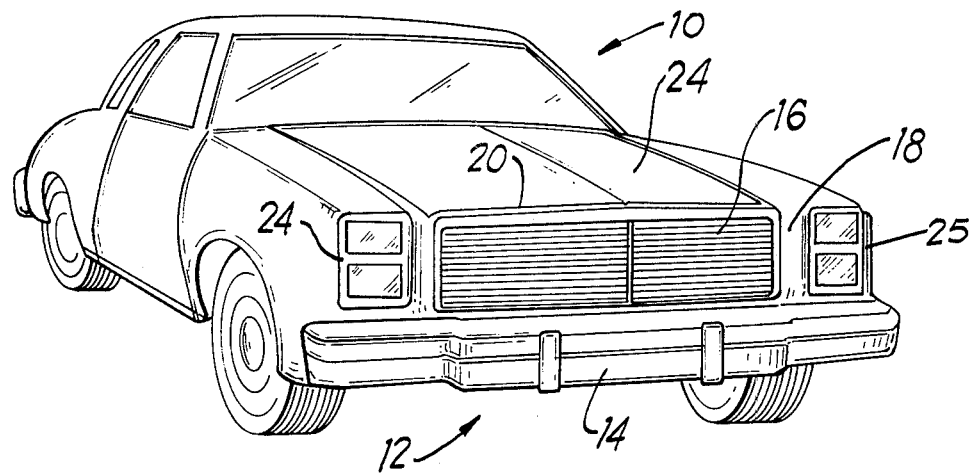
FIG. 2 illustrates a front perspective view of an automobile including the front fascia of the automobile.

Referring to FIGS. 1 and 2, the front fascia 12 of a motor vehicle 10 (e.g., automobile as depicted or even a truck) generally includes the front horizontal bumper 14, the grill assembly 16, the upwardly extending front wall 18 of the motor vehicle 10 which extends upwardly to an upper horizontal edge 20, wherein the front hood 24 closes downwardly on the upper horizontal edge 20 of front wall 18, and the headlight settings 24 and 25 which are disposed in the upwardly extending front wall 18.

Figure 3:
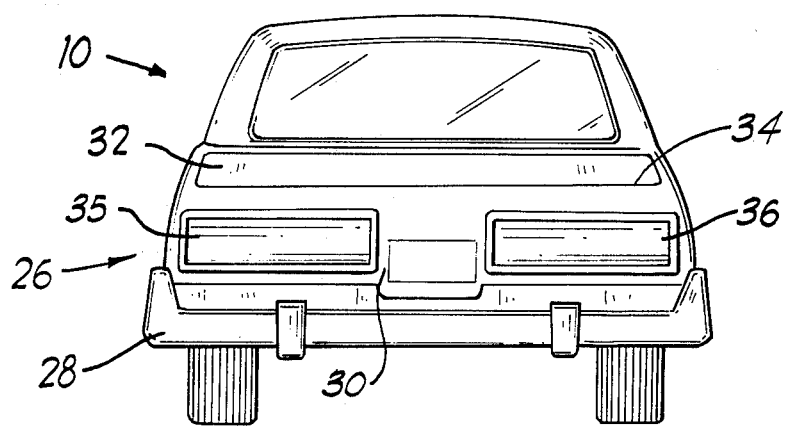
FIG. 3 illustrates a rear perspective view of an automobile including the rear fascia of the automobile.

Referring to FIGS. 1 and 3, the rear fascia 26 of the motor vehicle 10 generally includes the rear horizontal bumper 28, the upwardly extending rear wall 30 of the motor vehicle 10, which extends upwardly to horizontal edge 34, wherein the rear hood 32 closes downwardly on the upper horizontal edge 34 of the rear wall 30 and the rear tail light settings 35 and 36 which are disposed in the rear wall 30. The term "fascia" as used herein may include all or a portion of the previously described elements.

The basic requirements for automotive fascia presented by the automotive industry are given by:

| Property | Requirement |
|---|---|
| Tensile at break, psi (ASTM-D-638) | 1500 min. |
| Ultimate elongation, % (ASTM-D-638) | 150 min. |
| Tear strength, ppi (ASTM-D-624) | 300 min. |
| Flexural Modulus, psi (ASTM D-790) | |
| at −28° C. | 100,000 max. |
| at 28° C.* | 20,000–30,000 |
| at 70° C. | 7,000 min. |
| Flexural set, Chevrolet CTZ-ZZ003AA degrees after 5 min. | 15 max. |
| Heat Sag., Chevrolet CTZ-ZZ006AA cm at 121° C. | 4 max. |

*A maximum flexural modulus at 23° C. of 50,000 may be specified.

In addition, materials have to be mar resistant to avoid scratch marks which may be experienced in stone deflection or other types of contacts to which fascia may be exposed. There is no test to specify mar resistance and some comparative results are obtained by finger nailing or scratching the materials.

The elastomeric compositions for forming the front fascia 12 and rear fascia 26 by a conventional injection molding process generally comprise a neutralized sulfonated elastomeric polymer, a preferential plasticizer and a polyolefinic thermoplastic, wherein the compositions can be extended and modified with certain critically selected fillers and oils and readily colored with pigments.

The automotive fascia formed by the injection molding process has an elastomeric inner core 13 and a polyolefinic thermoplastic-rich outer shell 15 as depicted in FIG. 4, wherein the elastomeric inner core 13 comprises an elastomeric blend of the neutralized sulfonated elastomeric polymer being plasticized with a preferential plasticizer and a polyolefinic thermoplastic resin, and the polyolefinic thermoplastic-rich outer shell 15 comprises a thermoplastic blend of a major portion of the polyolefinic thermoplastic resin and a minor portion of the neutralized sulfonated elastomeric polymer being plasticized with a preferential plasticizer. The elastomeric compositions which are formed by the injection molding process into the automotive fascia generally comprise a neutralized sulfonated elastomeric polymer, a preferential plasticizer, and a polyolefinic thermoplastic resin wherein the elastomeric compositions are optionally extended with fillers, reinforcing agents, nonpolar process oils, waxes, and pigments. During the injection molding process, there occurs a phase separation of the components of the elastomeric composition wherein at least about 75 wt. % of the polyolefinic thermoplastic and less than 20 wt. % of the neutralized sulfonated elastomeric polymer being plasticized with the preferential plasticizer migrate towards the outer surface of the formed fascia thereby creating the outer shell 15 of the formed automotive fascia which will generally comprise a polyolefinic thermoplastic and about 0.5 to about 20 parts by weight of the neutralized sulfonated elastomeric polymer being plasticized with the preferential plasticizer per 100 parts by weight. The thickness of the outer shell of the automotive fascia is about 0.002 to 0.03 inch, more preferably about 0.003 to 0.02 inch, and most preferably about 0.005 to about 0.01 inch. The inner core 13 generally comprises a neutralized sulfonated elastomeric polymer being preferentially plasticized with a preferential plasticizer and about 10 to about 300 parts by weight of a polyolefinic thermoplastic resin per 100 parts of the combined weight of the neutralized sulfonated elastomeric polymer and the preferential plasticizer, wherein the concentration of the preferential plasticizer is about 1 to about 60 parts by weight per 100 parts by weight of the neutralized sulfonated elastomer polymer. The optional additives such as fillers, nonpolar process oils and waxes are predominantly incorporated into the inner core 13 of the automotive fascia, for example at least about 70 wt. % of the extender initial concentration into the elastomeric composition prior to the injection molding process is incorporated into the inner core 13 of the automotive fascia, more preferably 80 wt. %.

The neutralized sulfonated elastomeric polymers of the present invention are derived from synthetic elastomeric polymers having olefinic unsaturation sites, wherein the polymer has from about 0.1 to about 10.0 mole percent olefinic unsaturation. The unsaturation sites can be in the polymeric backbone, pendant therefrom or cyclic. The preferred synthetic elastomeric polymers are selected from EPDM terpolymers and Butyl rubbers, wherein EPDM terpolymers are preferred. However, other low unsaturated elastomeric polymers are also useful and are selected from partially hydrogenated isoprenes, partially hydrogenated polybutadienes, styrene-butadiene copolymers, and isoprene-styrene random copolymers.

The term "EPDM" is used in the sense of its definition as found in ASTM D-1418-64 and is intended to mean a terpolymer containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred terpolymers contain about 45 to about 80 wt. % ethylene and about 1 to about 10 wt. % of a diene monomer, the balance of the polymer being propylene (10 to 54 wt. %). More preferably, the polymer contains about 50 to about 70 wt. % ethylene, e.g., 50 wt. %, and about 2.6 to about 9.0 wt. % diene monomer, e.g., 5.0 wt. %. The diene monomer is preferably a nonconjugated diene. The $\overline{M}n$ as measured by GPC of the terpolymer is preferably about 10,000 to about 200,000, more preferably about 15,000 to about 100,000, and most preferably about 20,000 to about 60,000. The Mooney viscosity (ML, 1+8, 212° F.) of the terpolymer is preferably 5 to 90, more preferably 10 to 60 and most preferably 15 to 55; e.g., 20. The $\overline{M}v$ by GPC measurement of the EPDM is preferably below about 350,000 and more preferably below about 300,000; e.g., 160,000. The $\overline{M}w$ by GPC mesurement of the EPDM is preferably below about 500,000, and more preferably below about 350,000; e.g., 200,000. The distribution (D) = Mw/Mv should be less than about 3.

Illustrative of the nonconjugated diene monomers which may be used in the EPDM terpolymer are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity (ML, 1+8, 212° F.) of about 40 and having 50 wt. % of ethylene, 45 wt. % of propylene and 5.0 wt. % of 5-ethylidene-2-norbornene with an $\overline{M}n$ of about 47,000 and an $\overline{M}v$ of about 145, and an $\overline{M}w$ of about 174,000. The Vistalon 2504 can be reprocessed through an extruder to produce a material (Vistalon 2504-20) having a Mooney viscosity of 20. Vistalon 3708 (Exxon Chemical Co.) is a terpolymer having a Mooney viscosity (ML, 1+8, 212° F.) of about 45–55 with an $\overline{M}n$ as measured by GPC of about 53,000, an $\overline{M}w$ as measured by GPC of about 343,000 and an $\overline{M}v$ as measured by GPC of about 270,000. Vistalon 6505 (Exxon Chemical Co.) is a terpolymer having a Mooney viscosity (ML, 1+8, 212° F.) of about 44–55 range and having about 53 wt. % of ethylene, about 9.0 wt. % of 5-ethylidene-2-norbornene and about 38 wt. % of propylene. Nordel 1320 (duPont) is another EPDM terpolymer having a Mooney viscosity (ML, 1+8, 212° F.) of about 25 and having about 53 wt. % of ethylene, about 3.5 wt. % of 1,4-hexadiene and about 43.5 wt. % of propylene.

The expression "Butyl rubber" as employed in the specification and claims is intended to include copolymers made from a polymerization reaction mixture having from 70 to 99.5% by weight of an isoolefin which has about 4 to about 7 carbon atoms (e.g., isobutylene) and about 0.5 to 30% by weight of a conjugated multiolefin having from about 4 to 14 carbon atoms (e.g., isoprene). The resulting copolymer contains 85 to 99.8% by weight of combined isoolefin and 0.2 to 10% of combined multiolefin, preferably about 0.5 to about 6%, more preferably about 1 to about 4%, e.g., 2%. Butyl rubber generally has a Staudinger molecular weight of about 20,000 to about 500,000, preferably about 25,000 to about 400,000, more preferably 100,000 to about 400,000 and a Wijs Iodine Number of about 0.5 to 50, preferably 1 to 15. The Mooney viscosity (ML, 1+8, 212° F.) of the Butyl rubber is about 5 to about 90, more preferably about 10 to about 60 and more preferably about 15 to about 50. The preparation of Butyl rubber is described in U.S. Pat. No. 2,356,128, which is incorporated herein by reference. Illustrative of Butyl rubber useful in the instant invention is Exxon Butyl 365 (Exxon Chemical Co.), having a mole percent unsaturation of about 2.0% and a Mooney viscosity (ML, 1+8, 212° F.) of about 40-50.

The unsaturated sites of the olefinically unsaturated elastomeric polymer are sulfonated with a sulfonating agent selected from an acyl sulfate, a mixture of sulfuric acid and an acid anhydride or a sulfur trioxide donor complexed with a Lewis base containing oxygen, nitrogen or phosphorous. The term "sulfur trioxide donor" as used in the specification means a compound containing available sulfur trioxide. Illustrative of such sulfur trioxide donors are $SO_3$, chlorosulfonic acid, fluorosulfonic acid, sulfuric acid, oleum, etc. The term "complexing agent" as used in the specification means a Lewis base which is an electron pair donor. Typical Lewis bases are: dioxane, tetrahydrofuran, tetrahydrothiophene or triethyl phosphate. The molar ratio of $SO_3$ donor to complexing agent may be as high as 15:1; preferably less than about 9:1, more preferably about 4:1 to about 1:1, e.g., 2:1. The preferred solvents for preparation of the complexes of sulfur trioxide donor with complexing agents are chlorinated hydrocarbons. Illustrative of such chlorinated solvents are carbon tetrachloride, dichloroethane, chloroform, and methylene chloride. The complexes may also be prepared by direct addition of reagents if precautions are taken to dissipate evolved heat. The reactions of etheral complexes of $SO_3$ with the unsaturation of polymer chains has been found to be nonquantitative generally because they are consumed through side reactions with impurities such as water. Therefore, the use of excess complex is desirable to give the required amount of sulfonation.

Acyl sulfates, which are suitable sulfonating agents, are selected from acetyl, propionyl, butyryl or benzoyl sulfate, in particular acetyl sulfate. The acyl sulfate may be produced by reacting concentrated sulfuric acid with an acid anhydride or an acid halide in the presence or the absence of a solvent. For example, acetic anhydride may be reacted with sulfuric acid to form acetyl sulfate which may be used to sulfonate the polymers of this invention. If desired, acetic anhydride may be added to a solution of the polymer in a suitable solvent and sulfuric acid subsequently added to form acetyl sulfate in situ. Alternatively, acetyl sulfate may be preformed by reaction of sulfur trioxide with acetic acid in a nonreactive solvent. It should be pointed out that neither the sulfonating agent nor the manner of sulfonation is critical, providing that the sulfonation method does not degrade the polymer backbone. The elastomers to be sulfonated are first dissolved in a suitable solvent and then reacted with the sulfonating agent. The solvent medium must be a neutral one for the rubber and the sulfonating agent. The solvent is preferably an aromatic hydrocarbon, an aliphatic hydrocarbon, a cycloaliphatic hydrocarbon or a halogenated aromatic hydrocarbon. Illustrations of these solvents are: isopentane, pentane, cyclohexane, isohexane, hexane, heptane, and homologues thereof, benzene, toluene, chlorobenzene or xylene. The preferred solvent is an aliphatic hydrocarbon.

Sulfonation of the polymer is conducted at a temperature between $-100°$ C. and $+100°$ C. and occurs when the sulfonating agent is added to the polymer solution. The sulfonating agent is dissolved in a suitable solvent or may be added directly without solvent. With acetyl sulfate reagent it is most preferred to add acetic anhydride to the polymer cement and then sulfuric acid to prepare the acetyl sulfate reagent in situ. Reaction time may be about 1 to about 60 minutes, more preferably about 5 to about 45 minutes and most preferably about 15 to about 30, wherein the product remains soluble throughout the reaction period. The sulfonated elastomer is quenched with water, or a liquid aliphatic alcohol such as methanol, ethanol or isopropanol, an aromatic hydroxyl compound such as phenol, or a cycloaliphatic alcohol such as cyclohexanol. The amount of desirable sulfonation depends on the particular application. Preferably, the elastomeric polymer is sulfonated at about 10 to about 100 meq. unneutralized sulfonate groups/100 g. of sulfonated polymer, more preferably at about 15 to about 50 meq. sulfonate groups/100 g. of sulfonated polymer and most preferably at about 20 to about 40 meq. sulfonate groups/100 g. of sulfonated polymer. The sulfonate content can be determined by either titration of the sulfonated polymer or Dietert Sulfur analysis. In the titration of the sulfonated polymer, the polymer is first dissolved in solvent consisting of 95 parts of toluene and 5 parts of methanol at a concentration level of 50 grams per liter of solvent. The sulfonated polymer is titrated with ethanolic sodium hydroxide to an Alizarin Thymolphthalein endpoint.

The sulfonated elastomeric polymers have been found to be somewhat deficient in thermostability. Therefore, it is desirable to neutrilize at least a portion of the sulfonated polymer. Neutralization further improves the physical properties of the sulfonated polymer. In preparing the neutralized sulfonated polymer, it is not necessary to neutralize every sulfonated precursor group. Preferably at least 75% of the sulfonated precursor groups are neutralized, though 100% of the sulfonated precursor groups may be neutralized if desired; more preferably about 90 to about 100% of the sulfonated precursor groups are neutralized; most preferably about 95 to about 100% are neutralized. The resultant neutralized sulfonated polymer has about 10 to about 100 meq. neutralized sulfonate groups/100 grams of neutralized elastomeric sulfonated polymer, more preferably about 15 to about 50 meq. neutralized sulfonate groups/100 grams of neutralized sulfonated elastomeric polymer and most preferably about 20 to about 40 meq. neutralized sulfonate groups/100 grams of neutralized sulfonated elastomeric polymer.

A preferred class of neutralizing agents of the present invention are basic salts of carboxylic acids, wherein the cation of the basic salt is selected from the group consisting of ammonium and metal ions of Groups IA, IIA, IB, and IIB and aluminum, lead, iron and antimony of the Periodic Table of Elements and mixtures thereof. Suitable monovalent metal ions are Na, K, Li, Cs, Ag, Hg and Cu. Suitable divalent metal ions are Be, Mg, Ca, Sr, Ba, Cu, Cd, Hg, Pb, Fe, Hg and Zn. The carboxylate group of the metallic salt has about 2 to 30 carbon atoms, more preferably about 2 to 20. Nonlimiting examples of carboxylic acids which are useful are: acetic, benzoic, lauric, palmitic, myristic, decanoic, octanoic, and stearic. Neutralization can also be effected with metallic oxides wherein the metallic ion is selected from the group consisting of Groups IIA, IIB and lead and mixtures thereof of the Periodic Table of Elements. Illustrative examples are MgO, CaO, BaO, ZnO, PbO$_2$, or Pb$_3$O$_4$ and mixtures thereof. Other useful neutralizing agents are hydroxides or alkoxides having 1 to 8 carbon atoms, wherein the cation is selected from ammonium and metal ions of Groups IA and IIA of the Periodic Table of Elements and mixtures thereof. Useful examples of hydroxides are NH$_4$OH, NaOH, KOH, LiOH, Mg(OH)$_2$ and Ba(OH)$_2$. Alternatively, less preferred neutralizing agents are aliphatic amines as defined in U.S. Pat. No. 3,642,728, incorporated herein by reference.

To the neutralized sulfonate terpolymer in solution is added a preferential plasticizer selected from the group consisting of carboxylic acids or metal salts of these carboxylic acids and mixtures thereof, wherein the metal cation of the salt of the carboxylic acid is selected from the group consisting of lead, iron, antimony, aluminum and Groups IA, IIA, IB and IIB of the Periodic Table of Elements thereof, and the carboxylic acid has about 8 to about 22 carbon atoms. The preferential plasticizer which has a melting point of above about 25° C. is incorporated into the neutralized sulfonated elastomeric polymer at about 1 to about 60 parts by weight per hundred parts by weight of the neutralized sulfonated elastomeric polymer, more preferably at about 8 to about 45, and most preferably at about 10 to about 50. Other preferential plasticizers useful in the instant invention are selected from amides having an alkyl group containing about 10 to 22 carbon atoms such as stearamide, ureas, and thioureas and mixtures thereof; however, compounds such as esters, ketones or alcohols will not provide a necessary balance of rheological and physical properties which are necessary for a low pressure injection molding composition. The preferred plasticizers are selected from the metal salts of long chain saturated aliphatic carboxylic acids having about 8 to about 22 carbon atoms such as zinc stearate.

The polyolefinic thermoplastic resins of this invention are selected from one of the following groups of resins: crystalline polyolefinic thermoplastic resins such as high and low density polyethylene, crystalline polypropylene, crystalline poly-1-butene, crystalline ethylene alpha-olefin copolymers such as crystalline ethylene-propylene copolymers, and trans-1,4-polybutadiene. The crystalline polyolefinic thermoplastic resins employed in the solid, gel-free elastomeric blend compositions are characterized as a polymer of an alpha-olefin having a molecular weight ($\overline{M}n$) as measured by GPC of at least 2,000, preferably at least 10,000, and more preferably at least 20,000. These thermoplastic resins comprise substantially an olefin but may incorporate other monomers, for example, vinyl acetate, acrylic acid, methyl acrylate, ethyl acrylate, sodium acryllate, methyl methacrylate, ethyl methacrylate, methacrylic acid, sodium methacrylate, etc. The preferred polyolefins are selected from the group consisting of polymers of C$_2$–C$_4$ alpha-olefins. Most preferably, the polyolefins are selected from the group consisting of polyethylene, polybutene, polypropylene and ethylene-propylene copolymers. It is important that the crystalline polyolefin have a degree of crystallinity of at least 25% and most preferably at least 40%. The crystalline polyolefin will also have a melting point of at least 50° C., preferably at least 70° C. High, medium and low density polyethylene are within the scope of the instant invention. For example, polyethylenes having a density from 0.90 to 0.97 gms/cc are generally included.

The polypropylene polymers suitable for this invention can be homopolymer resins of polypropylene or impact modified polypropylene resins having about 1 to about 25 wt. % of a rubber such as ethylene-polypropylene copolymers or styrene butadiene copolymers or any other suitable rubber. The $\overline{M}n$ as measured by GPC of the polypropylene is about 2,000 to about 200,000, the $\overline{M}w$ as measured by GPC is about 20,000 to about 1,000,000 and the melt flow rate (ASTM D1238) is about 0.5 to about 40. Typical examples of suitable polypropylene resins are Exxon (E-612) having a melt flow of 0.6, and $\overline{M}n$ of 85,000 and an $\overline{M}n$ of about 600,000. Another useful resin is Exxon (CD-530) which has an $\overline{M}n$ of about 32,000, an $\overline{M}w$ of about 250,000 and a melt flow rate of about 12. Another polypropylene resin is Exxon CD-460 having a melt flow rate of about 20.

The crystalline polyolefins suitable for this invention can vary in molecular weight ($\overline{M}n$) from as low as 2000 up to and exceeding 200,000. The preferred molecular weight range is from 10,000 to 110,000. If the molecular weight of the polyolefin is too low, the crystalline polyolefin is essentially a wax. While effective in lowering the melt viscosity of the blend, the physical properties of such blends are generally inferior to those of higher molecular weight polyolefins. However, low molecular weight crystalline polyolefins, waxes, may be used at low levels in conjunction with the defined polyolefins as viscosity reducers. For very high molecular weight polyolefins, the resulting blends exhibit excellent physical properties but poor processability. In these cases, the addition of a minor amount of a compatible wax, e.g., from 2 to 30 parts by weight per 100 parts by weight of the neutralized sulfonated elastomer, would be advantageous. The crystalline polyolefin is blended with the neutralized sulfonated elastomeric polymer described above at a level of about 10 to 300 parts by weight per 100 parts by weight of the neutralized sulfonated elastomeric polymer, preferably from about 10 to 150 parts by weight per 100 parts by weight of the sulfonated neutralized elastomeric polymer, and preferably from 15 to 100 parts by weight per 100 parts by weight of the neutralized sulfonated elastomeric polymer.

The critically selected fillers which can be optionally employed in the elastomeric blend compositions are selected from the group consisting of carbon blacks, aluminosilicates, talcs, calcium silicate, ground calcium carbonate, water precipitated calcium carbonate, magnesium silicate and delaminated, calcined and hydrated clays and mixtures thereof. Examples of carbon black are acetylinics, furnace, channel or lamp blacks. These fillers are incorporated into the blend composition at about 1 to about 300 parts by weight per 100 parts by weight of the neutralized sulfonated elastomeric polymer, more preferably at about 3 to about 250 and most preferably at about 10 to about 200. Typically, these fillers have a particle size of about 0.03 to about 15 microns, more preferably about 0.1 to about 10. The oil absorption as measured by grams of oil absorbed by 100 grams of filler is about 10 to about 70, more preferably about 10 to about 50 and most preferably about 10 to about 35. Typical mineral fillers employed in this invention are illustrated in Table I.

TABLE I

| Filler | Code # | Oil Absorption, grams of oil/ 100 grams of filler | Specific Gravity | Avg. Particle Size Micron | pH |
| --- | --- | --- | --- | --- | --- |
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Magnesium silicate (talc) | Mistron Vapor | 60–70 | 2.75 | 2 | 9.0–7.5 |

The oils employed in the present invention are non-polar backbone process oils having less than about 2 wt. % polar type compounds as measured by molecular type clay gel analysis. These oils are selected from paraffinics ASTM type 104B as defined in ASTM D-2226-70, aromatics ASTM type 102 or naphthenics ASTM type 104A wherein the oil has a flash point by the Cleveland open cup of at least 350° F., a pour point of less than 40° F., a viscosity of about 70 to about 3000 s.s.u.'s and a number average molecular weight as measured by GPC of about 300 to about 1000, more preferably 300 to 750. The preferred process oils are paraffinics. Table II illustrates typical oils encompassed by the scope of this invention. The preferred process oil is a paraffinic type having an $\overline{M}n$ of at least about 300.

The process oil is preferably incorporated into the elastomeric product at about 5 to about 150 parts by weight per 100 parts by weight of the neutralized sulfonated elastomeric polymer, more preferably at about 25 to about 100, and most preferably at about 40 to about 100.

TABLE II

| Type Oil | Oil Code # | Viscosity ssu | $\overline{M}n$ | % Polars | % Aromatics | % Saturates |
| --- | --- | --- | --- | --- | --- | --- |
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |
| Naphthenic | Sunthene 4240 | 2206 | — | 1.1 | 43.9 | 55.0 |

DETAILED DESCRIPTION

The advantages of the improved elastomeric blend compositions used to form the automotive fascia may be more readily appreciated by reference to the following examples:

EXAMPLE 1

Blends of Thionic rubbers, polypropylene and oil were formed by mixing in an intensive internal mixer:

| | 1 | 2 |
| --- | --- | --- |
| Thionic 303 | 60 | — |
| Thionic 304 | — | 70 |
| CD 530, polypropylene | 40 | 30 |
| Sterling VH black | 1.5 | — |
| Sunpar 2280 oil | 20 | 10 |
| Stabilizers | 0.2 | 0.54 |

Thionic 303 is a sulfonated EPDM containing about 56% by weight of ethylene and about 30 millimoles of elemental sulfur per 100 grams. Thionic 304 is a sulfonated EPDM containing about 75% by weight of ethylene and about 30 millimoles of elemental sulfur per 100 grams. CD 530 is an Exxon polypropylene with a flow rating of 12 MFR.

The materials were molded for evaluation on a reciprocating screw injection molding machine. Conditions were similar to those used for polypropylene with a flat temperature profile of 220° C. along the machine barrel. Resulting properties were:

| | 1 | 2 |
| --- | --- | --- |
| Tensile at break (23° C.), psi | 1940 | 1980 |
| Ultimate elongation (23° C.), % | 490 | 190 |
| Flexural Modulus, psi | | |
| at −28° C. | 79,000 | 80,300 |
| at 23° C. | 21,500 | 23,600 |
| at 70° C. | 8,800 | 9,200 |
| Flexural Set, Chevrolet CTZ-ZZ003AA, deg. at 5 min. | 15 | 14 |
| Heat Sag, Chevrolet CTZ-ZZ006AA cm at 121° C. | 1.3 | 1.3 |
| MFR (230° C., 2160 g), g/10 min. | 0.3 | 0.2 |

Painting of these samples was accomplished by using standard priming techniques used for polypropylene based thermoplastic olefins.

EXAMPLE 2

A blend of 70% by weight of a Thionic rubber, 29.6% of polypropylene and 0.4% of stabilizing additives was mixed in an intensive internal mixer. The Thionic rubber was a sulfonated EPDM containing about 75% by weight of ethylene and about 30 millimoles of elemental sulfur per 100 grams. The polypropylene was Exxon CD 530, a 12 MFR grade.

The material was molded for testing at conditions similar to those used for polypropylene. A 220° C. flat profile was used with a reciprocating screw injection molding machine.

Properties were:
| | |
| --- | --- |
| Tensile at break (23° C.), psi | 3540 |
| Ultimate elongation (23° C.), % | 530 |
| Tensile at break (70° C.), psi | 1870 |
| Ultimate elongation (70° C.), % | 880 |
| Flex Modulus (23° C.), psi | 46,000 |
| Flexural set, Chevrolet CTZ- | 16 |

| | |
|---|---|
| ZZ003AA deg. at 5 min. Heat Sag, Chevrolet CTZ-ZZ00622 cm at 121° C. | 1.1 |
| MFR (230° C., 2160 g), g/10 min. | 0.3 |

The material exhibited relatively good mar resistance. The flexural set of 16 degrees is relatively low for a stiffer material exhibiting a flexural modulus at 23° C. of 46,000 psi. There is a recent tendency to specify higher stiffness thermoplastic elastomers for automotive use.

Lowering the polypropylene content will lower the stiffness and the flexural set.

What is claimed is:

1. A rear or front automotive fascia for a motor vehicle formed from a polymeric composition which comprises:
   (a) a neutralized sulfonated elastomeric polymer having about 10 to about 60 meq. of neutralized sulfonate groups per 100 grams of said neutralized sulfonated elastomeric polymer;
   (b) about 10 to about 300 parts by weight of a crystalline polyolefinic resin having an Mn of about at least 2000 per 100 parts by weight of said neutralized sulfonated elastomeric polymer; and
   (c) about 10 to about 50 parts by weight of a preferential plasticizer per 100 parts by weight of said neutralized sulfonated elastomeric polymer, wherein said preferential plasticizer has a melting point of at least 25° C. and is selected from the group consisting of amides having about 10 to 22 carbon atoms, ureas and thioureas, carboxylic acids having at least 8 carbon atoms and metallic salts of said carboxylic acids and mixtures thereof.

2. A fascia according to claim 1 wherein said neutralized sulfonated elastomeric polymer is formed from an elastomeric polymer selected from the group consisting of Butyl rubber and an EPDM terpolymer.

3. A fascia according to claim 1 wherein said neutralized sulfonate groups are neutralized with a counterion being selected from the group consisting of ammonium, antimony, iron, aluminum, lead and metal ions of Groups IA, IIA, IB, and IIB of the Periodic Table of Elements and mixtures thereof.

4. A fascia according to claim 2 wherein said EPDM terpolymer consists of about 40 to about 80 wt. % of ethylene, of about 10 to about 54 wt. % of propylene, and of about 1 to about 10 wt. % of a nonconjugated diene.

5. A fascia according to claim 4 wherein said nonconjugated diene is selected from the group consisting of 1,4-hexadiene, dicyclopentadiene, 5-alkylidene-2-norbornene, 5-alkenyl-2-norbornenes and tetrahydroindene.

6. A fascia according to claim 5 wherein said nonconjugated diene is 5-ethylidene-2-norbornene.

7. A fascia according to claim 1 wherein said preferential plasticizer is a combination of a carboxylic acid and a metallic salt of said carboxylic acid, a metal ion of said metallic salt being selected from the group consisting of aluminum, antimony, iron, lead and metal ions of Groups IA, IIA, IB and IIB of the Periodic Table of Elements and mixtures thereof.

8. A fascia according to claim 7 wherein said metallic salt is selected from the group consisting of zinc stearate, zinc acetate and calcium stearate.

9. A fascia according to claim 1 further including a filler selected from the group consisting of fibers, clay, talc, silica, carbon black and calcium carbonate and mixtures thereof.

10. A fascia according to claim 1 further including a nonpolar process oil selected from the group consisting of paraffinic oils, naphthenic oils and aromatic oils and mixtures thereof, said nonpolar process oil less than about 2 wt. % polar constituents.

11. A fascia according to claim 1 wherein said polyolefinic thermoplastic is polypropylene and said plasticizer is zinc stearate.

12. A fascia according to claim 9 further including a nonpolar process oil selected from the group consisting of paraffinic oils, naphthenic oils and aromatic oils and mixtures thereof, said nonpolar oil having less than about 2 wt. % polar constituents.

13. A formed elastomeric article comprising:
   (a) an inner core which comprises:
      (i) a neutralized sulfonated elastomeric polymer being plasticized with a preferential plasticizer, wherein said preferential plasticizer has a melting point of at least 25° C. and is selected from the group consisting of amides having about 10 to 22 carbon atoms, ureas and thioureas, carboxylic acids having at least 8 carbon atoms and metallic salts of said carboxylic acids and mixtures thereof, wherein the concentration of said preferential plasticizer is about 1 to about 60 parts by weight per 100 parts by weight of said neutralized sulfonated elastomeric polymer, said neutralized sulfonated elastomeric polymer having about 10 to about 60 meq of neutralized sulfonate groups per 100 grams of said neutralized sulfonated elastomeric polymer;
      (ii) about 10 to about 300 parts by weight of a crystalline polyolefinic thermoplastic resin having an Mn of about at least 2000, per 100 parts by weight of the combined weight of said neutralized sulfonated elastomeric polymer and said preferential plasticizer in said inner core;
   (b) an outer shell comprising:
      (i) said polyolefinic thermoplastic;
      (ii) about 0.5 to about 25 parts by weight of said neutralized sulfonated elastomeric polymer being plasticized with said preferential plasticizer per 100 parts by weight of said polyolefinic thermoplastic resin in said outer core.

14. An article according to claim 13 wherein said neutralized sulfonated elastomeric polymer is formed from an elastomeric polymer selected from the group consisting of Butyl rubber and an EPDM terpolymer.

15. An article according to claim 13 wherein said neutralized sulfonate groups are neutralized with a counterion being selected from the group consisting of ammonium, antimony, iron, aluminum, lead and metal ions of Groups IA, IIA, IB and IIB of the Periodic Table of Elements and mixtures thereof.

16. An article according to claim 14 wherein said EPDM terpolymer consists of about 40 to about 80 wt. % of ethylene, of about 10 to about 53 wt. % of propylene and of about 2 to about 10 wt. % of a nonconjugated diene.

17. An article according to claim 16 wherein said nonconjugated diene is selected from the group consisting of 1,4-hexadiene, dicyclopentadiene, 5-alkylidene-2-norbornene, 5-alkenyl-2-norbornenes and tetrahydroindene.

18. An article according to claim 17 wherein said nonconjugated diene is 5-ethylidene-2-norbornene.

19. An article according to claim 13 wherein said preferential plasticizer is a combination of a carboxylic acid and a metallic salt of said carboxylic acid, a metal ion of said metallic salt being selected from the group consisting of aluminum, antimony, iron, lead and metal ions of Groups IA, IIA, IB and IIB of the Periodic Table of Elements and mixtures thereof.

20. An article according to claim 19 wherein said metallic salt is selected from the group consisting of zinc stearate, zinc acetate and calcium stearate.

21. An article according to claim 13 further including a filler selected from the group consisting of fibers, clay, talc, silica, carbon black and calcium carbonate and mixtures thereof.

22. An article according to claim 13 further including a nonpolar process oil selected from the group consisting of paraffinic oils, naphthenic oils and aromatic oils and mixtures thereof, said nonpolar process oil having less than about 2 wt. % polar constituents.

23. An article according to claim 13 wherein said polyolefinic thermoplastic is polypropylene and said plasticizer is zinc stearate.

24. An article according to claim 21 further including a nonpolar process oil selected from the group consisting of paraffinic oils, naphthenic oils and aromatic oils and mixtures thereof, said nonpolar process oil having less than about 2 wt. % polar constituents.

25. An article according to claim 13 wherein said article is an automotive fascia.

* * * * *